(12) United States Patent
Lohtia et al.

(10) Patent No.: US 6,907,228 B1
(45) Date of Patent: Jun. 14, 2005

(54) ALLOCATING CARRIER FREQUENCIES FOR COMMUNICATING BEACON CONTROL SIGNALING

(75) Inventors: Anit Lohtia, Plano, TX (US); Yuqiang Tang, Plano, TX (US); Paul Chan H. Tse, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 466 days.

(21) Appl. No.: 10/056,538

(22) Filed: Jan. 24, 2002

Related U.S. Application Data

(60) Provisional application No. 60/313,923, filed on Aug. 21, 2001.

(51) Int. Cl.[7] .............................................. H04B 15/00
(52) U.S. Cl. ......................... 455/62; 455/63.3; 455/68; 455/419; 455/422; 455/426; 455/552; 370/342; 370/441
(58) Field of Search .......................... 455/62, 63.3, 68, 455/419, 422, 426, 552, 553; 370/342, 441

(56) References Cited

U.S. PATENT DOCUMENTS

| | | | | |
|---|---|---|---|---|
| 5,239,678 A | * | 8/1993 | Grube et al. ................. | 455/511 |
| 5,425,049 A | * | 6/1995 | Dent ........................... | 375/132 |
| 6,023,460 A | * | 2/2000 | Jackson et al. .............. | 370/330 |
| 6,070,070 A | * | 5/2000 | Ladue ......................... | 455/419 |
| 6,137,787 A | * | 10/2000 | Chawla et al. ............... | 370/337 |
| 6,473,412 B1 | * | 10/2002 | Haartsen ..................... | 370/331 |
| 2002/0097703 A1 | * | 7/2002 | Nieczyporowicz et al. . | 370/342 |

OTHER PUBLICATIONS

Global System for Mobile Communications, Draft ETSI EN 300 908 V8.5.0 (Jul. 2000), "*Digital Cellular Telecommunications System (Phase 2+); Multiplexing and Multiple Access on the Radio Path (GSM 05.02 version 8.5.0 Release 1999)*", pp. 1–79 (Jul. 2000).

Global System for Mobile Communications, Drat ETSI EN 301 349 V8.4.0 (May 2000), "*Digital Cellular Telecommunications System (Phase 2+); General Packet Radio Service (GPSR); Mobile Station (MS) –Base Station System (BSS) Interface; Radio Link Control/Medium Access Control (RLC/MAC) Protocol (GSM 04.60 version 8.4.0 Release 1999)*", pp. 1–216 (May 2000).

* cited by examiner

*Primary Examiner*—Lee Nguyen
*Assistant Examiner*—Minh D. Dao
(74) *Attorney, Agent, or Firm*—Trop, Pruner & Hu, P.C.

(57) ABSTRACT

A mobile communications network includes a plurality of cells and cell sectors in each cell. Carrier frequencies for carrying beacon control signaling, such as a broadcast control channel (BCCH), are assigned from the entire band of available carrier frequencies. The same carrier frequencies are assigned to carry traffic channels. This arrangement enables the use of one carrier frequency to communication beacon control signaling in one cell segment, while also allowing the use of the same one carrier frequency to communicate bearer traffic in another cell segment, thus affording substantial increases in network capacity that has heretofore not been possible in networks in the absence of significant infrastructure buildout or modification.

25 Claims, 3 Drawing Sheets

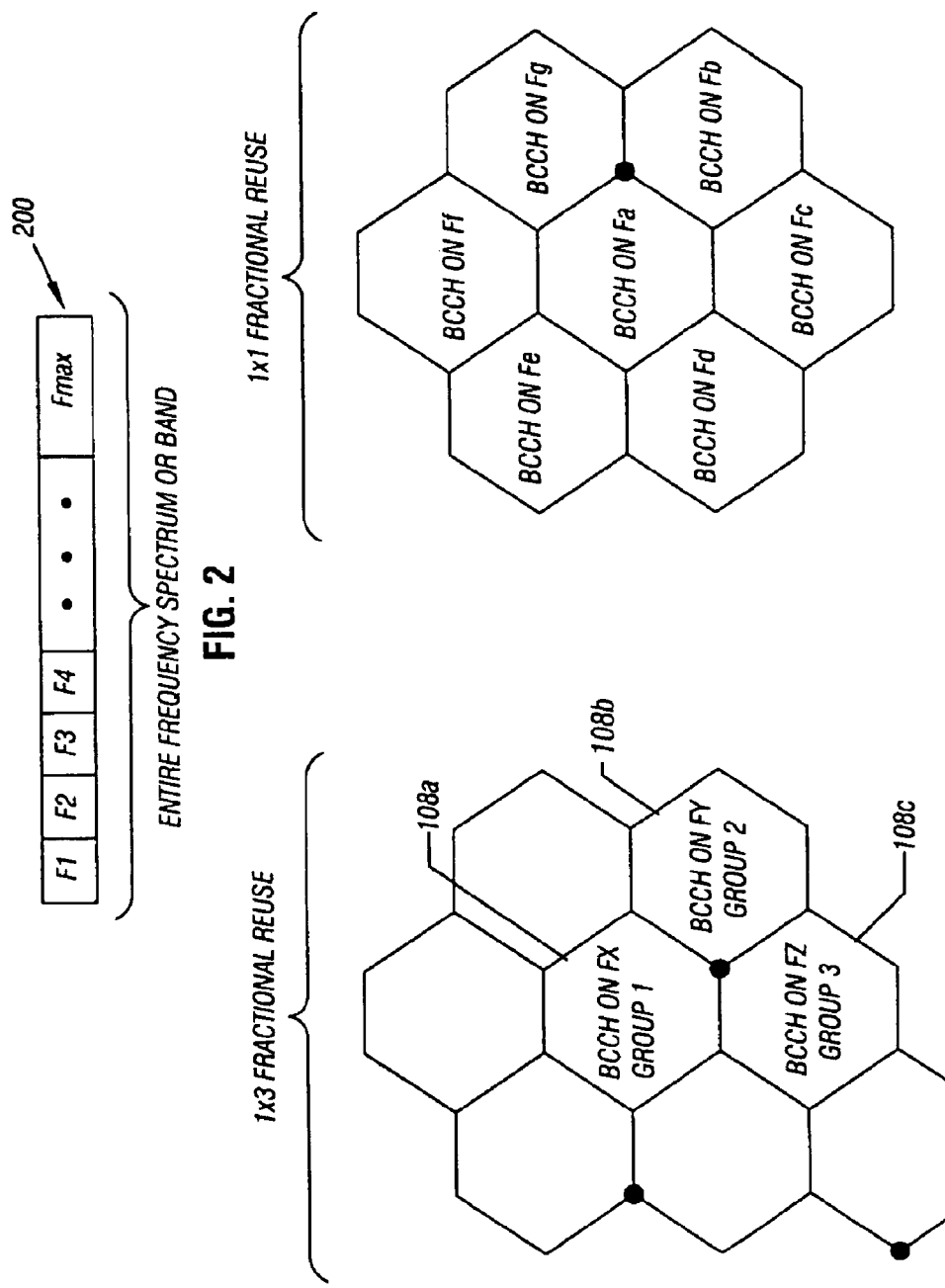

ALLOCATING CARRIER FREQUENCIES FOR COMMUNICATING BEACON CONTROL SIGNALING

CROSS-REFERENCE TO RELATED APPLICATION

This claims the benefit under 35 U.S.C. §119(e) to U.S. Provisional Application Ser. No. 60/313,923 filed Aug. 21, 2001.

TECHNICAL FIELD

This invention relates generally to allocating carrier frequencies for communicating beacon control signaling.

BACKGROUND

Mobile communications systems, such as cellular or personal communications services (PCS) systems, are formed of a plurality of cells. Each cell provides a radio communications center in which a mobile station establishes a call with another mobile station or a wireline station connected to a public switched telephone network (PSTN). Each cell includes a radio base station, with each base station connected to a mobile switching center that controls processing of calls between or among mobile stations or mobile stations and PSTN stations.

Various mobile communications protocols have been developed and implemented. One such protocol is the time-division multiple access (TDMA) protocol, with one version being the IS-136 standard (TIA/EIA-136) from the Telecommunications Industry Association (TIA). With IS-136 TDMA, each channel carries a frame that is divided into six time slots. Another TDMA-based protocol is the Global System for Mobile (GSM) protocol from the European Telecommunications Standards Institute (ETSI), which uses a TDMA frame divided into eight time slots.

Control signaling and bearer traffic (e.g., voice, data) is communicated over radio frequency (RF) carrier signals transmitted in both uplink (from mobile station to base station) and downlink (from base station to mobile station) directions. The RF carrier signals used in a mobile communications network are defined within an allocated frequency band or spectrum. Several frequency bands are allocated by governmental entities for use by wireless service providers in mobile communications networks.

Typically, the number of available carriers within each frequency band is relatively limited. To effectively use the limited carrier frequency band in a target coverage area, a frequency reuse pattern is implemented. In a frequency reuse pattern, groups of carrier frequencies are reused at regular distance intervals. In a traditional frequency reuse pattern, a predetermined number of cells are grouped into a cluster. The available carrier frequencies are then assigned to each cluster, with the number of carrier frequencies of each cluster divided among the number of cells in the cluster.

In a conventional mobile communications system, a block of available carrier frequencies are reserved for certain types of control signaling. One such control signaling is beacon control signaling, such as the broadcast control channel (BCCH) in a GSM mobile communications network. The BCCH is continuously transmitted by a base station in each cell, typically at full power, to provide certain types of information for mobile stations to use when the mobile stations first power up in a cell or transition from neighboring cells.

The reserved block of carrier frequencies is unavailable for communicating bearer traffic (e.g., voice, data, etc.) in any of the cells. As a result, the available bandwidth for communicating bearer traffic is further limited.

SUMMARY

In general, an efficient method and apparatus is provided for allocating carrier frequencies for communicating beacon control signaling and bearer traffic in a mobile communications network. For example, the method includes defining a band of frequencies for the mobile communications network. For a first cell segment, one of the frequencies in the band is allocated for communicating beacon control signaling. For another cell segment, the one of the frequencies is allocated to carry barrier traffic.

Other or alternative features in embodiments will become apparent from the following description, from the drawings, and from the claims.

BRIEF DESCRIPTION OF THE DRAWINGS

FIG. 2 illustrates the available frequency band used in the mobile communications network of FIG. 1.

FIG. 3 illustrates a 1×3 fractional reuse arrangement, according to one embodiment of the invention.

FIG. 4 illustrates a 1×1 fractional reuse arrangement, according to another embodiment of the invention.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible and are contemplated by the teachings of the present invention.

Figure 1:
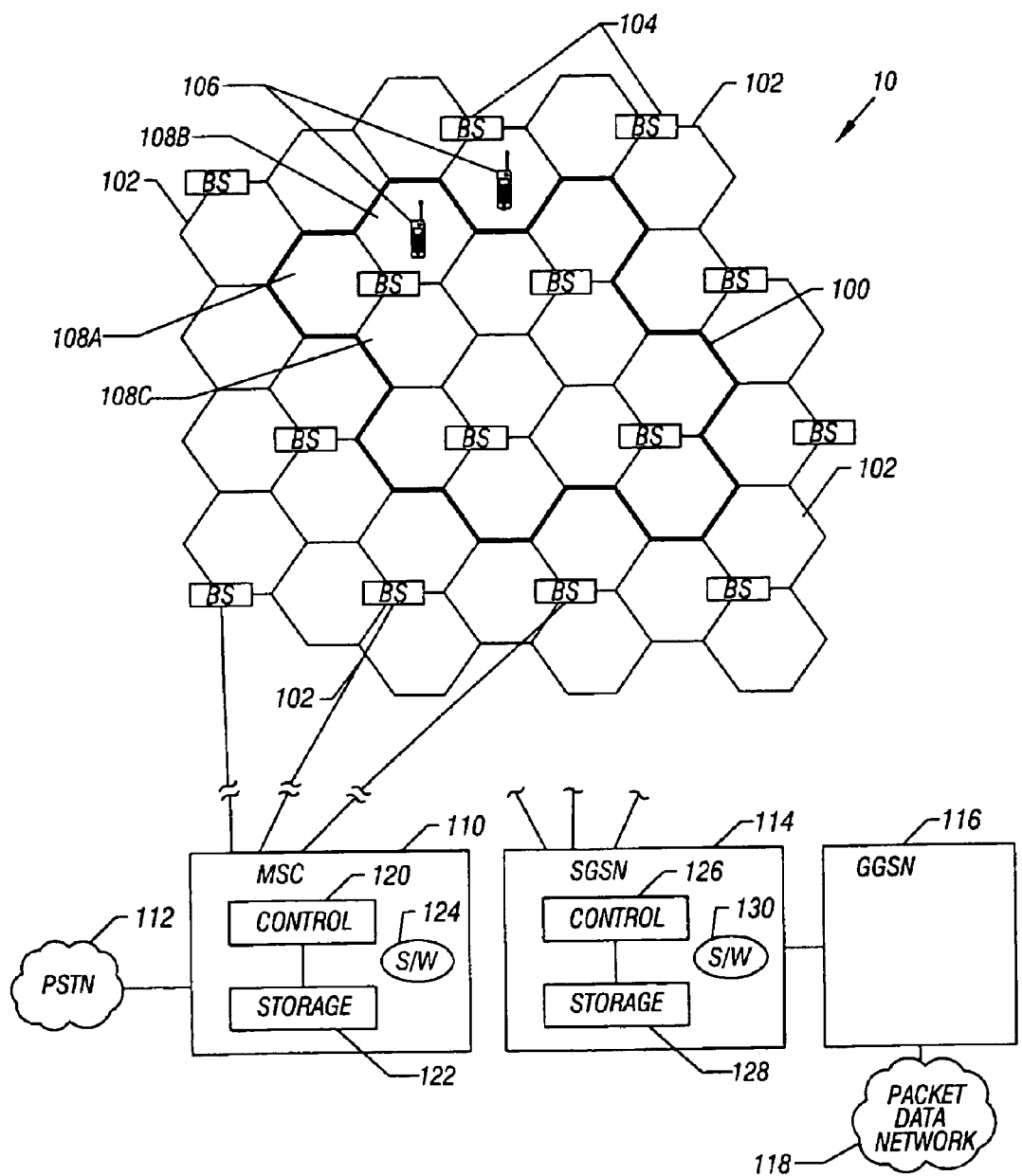
FIG. 1 illustrates an example arrangement of a mobile communications network.

FIG. 1 illustrates a mobile communications network 10 that includes a network of cells 102. The cells are served by corresponding base stations 104, which include transceivers for transmitting and receiving radio frequency (RF) carrier signals for communicating with mobile stations 106. In the example arrangement of FIG. 1, each cell is divided into three sectors 108A, 108B and 108C (referred to as a "tri-sector arrangement"). In other arrangements, each cell can have other numbers of sectors. Alternatively, a sectoring scheme is not used in another embodiment. As used here, the term "cell segment" generally refers to either the entire cell or to a cell sector.

With the tri-sector arrangement, one base station 104 serves all three sectors 108A–C of each cell 102. The base stations 104 are coupled to a mobile switching center (MSC) 110. Although not shown, base station controllers (BSCs) may be provided in communication with the base stations 104 and the MSC 110 in some embodiments. The MSC 110 performs numerous tasks, including the following: management and control of cell site equipment and connections; performance of call processing; provision of intersystem connections; provision of billing and operations and measurement tasks; provision of a home location register (HLR); provision of a visitor location register (VLR); and so forth. The MSC 110 also provides an interface to a public switched telephone network (PSTN) 112, which is coupled to land or wired stations.

The MSC 110 manages circuit-switched communications, in which a channel of the mobile communications network is allocated for a call session for the duration of the call session. In other words, as long as the call session is active, the allocated channel is not used by another call session. A typical example of circuit-switched communications is telephony voice communications.

Another type of communications that can be performed in the mobile communications network 10 is packet-switched communications, in which data is sent as bursts, typically in packets. Examples of packet-switched communications include electronic mail, web browsing, and so forth. It is typically inefficient to communicate packet-switched data over a circuit-switched connection. As a result, wireless packet-switched communications protocols have been implemented for efficiently communicating packet data Examples of wireless packet-switched communication protocols include GPRS (General Packet Radio Service) or EGPRS (Enhanced GPRS). One version of GPRS is defined by GSM (Global System for Mobile) Release 1997 while EGPRS is defined by 3GPP (Third Generation Partnership Project) UMTS (Universal Mobile Telecommunications System) Release 1999. Yet another protocol is the GSM/Enhanced Data Rate for Global Evolution Radio Access Network (GERAN) protocol. In other embodiments, other types of wireless packet-switched communications wireless protocols can be used.

For packet-switched services, the cellular network shown in FIG. 1 may be connected to a serving GPRS support node (SGSN) 114. Note that it is possible for both an MSC 110 and SGSN 114 to concurrently manage communications in the cellular network (the MSC 110 to manage circuit-switched communications and the SGSN 114 to manage packet-switched communications). Alternatively, only one of the MSC 110 and SGSN 114 is coupled to the cellular network. More generally, each of the MSC 110 and SGSN 114 is referred to as a "system controller" responsible for performing call processing, cell site equipment management, and other tasks.

In the example arrangement of FIG. 1, the SGSN 114 is coupled to a gateway GPRS support node (GGSN) 116, which is basically a gateway to a packet data network 118. The packet data network 118 can be a private network, such as a local area network (LAN) or wide are a network (WAN), or a public network such as the Internet. Packet-switched communications can occur between a mobile station 106 in the wireless communications network 10 and a network element (e.g., a computer, a network-based telephone, etc.) coupled to the packet data network 118.

In one embodiment, the mobile communications network 10 is based on a time-division multiple access (TDMA) communication protocol, such as a GSM-based protocol. In the GSM-based protocol, data and control signaling are carried in TDMA frames that are divided into eight time slots.

FIG. 2 depicts an available spectrum or band 200 of carrier frequencies that is allocated for use in the mobile communications network 10. The band of carrier frequencies 200 include F1, F2, ..., Fmax. For increased capacity, the band of carrier frequencies is reused at distance intervals according to a frequency reuse pattern. In the reuse pattern shown in FIG. 1, cells are grouped into clusters, with a cluster 100 containing twelve cell sectors. The available band 200 of carrier frequencies is divided among the cell sectors in the cluster 100. The same band of carrier frequencies 200 is reused in the next cluster 100. In other embodiments, described below, fractional reuse patterns can be employed.

In accordance with some embodiments of the present invention, for more efficient usage of the band 200 of carrier frequencies, a block of carriers is not reserved for communicating beacon control signaling, such as the broadcast control channel (BCCH) in a GSM-based system. As used here, "beacon control signaling" refers to signaling that is transmitted continuously by a base station, with the beacon control signaling containing information regarding the cell site, frequency allocations, frequency hopping sequences, and other information. The information provided by the beacon control signaling is used by a mobile station to perform communications in the mobile communications network.

In some conventional mobile communications networks, a block of carrier frequencies is reserved for beacon control signaling, such as BCCH. The reserved block of carrier frequencies is therefore unavailable for communicating bearer traffic (e.g., voice data, packet data, and other data) in any of the cells. As a result, the number of carrier frequencies available for communicating bearer traffic is reduced, which has the undesirable effect of reducing system capacity. The reduced number of carrier frequencies is particularly significant in a cellular network that has a relatively small number of carriers, such as GSM-based networks that utilize 200-kHz (kilohertz) carriers, which are much wider than the 30-kHz carriers used in IS-136 systems.

In accordance with some embodiments of the present invention, instead of reserving a block of carrier frequencies for communicating beacon control signaling, the entire band 200 of carrier frequencies is available for communicating beacon control signaling, with the same carrier frequencies also being available for communicating bearer traffic. Thus, a benefit offered by some embodiments of the invention is that a carrier frequency that is used for communicating beacon control signaling in one cell sector can be used for communicating bearer traffic in another cell sector. The only restriction is that if a carrier frequency Fx is used for communicating beacon control signaling in a given cell sector, the same frequency Fx cannot be used to communicate bearer traffic in the given cell sector. Also, another restriction is that neighboring cell sectors of the given cell sector also not use the beacon carrier frequency Fx for communicating bearer traffic in the neighboring cell sectors.

By not reserving a block of carrier frequencies for communicating beacon control signaling, a larger number of carrier frequencies is made available for communicating bearer traffic, such as voice traffic, data packets, and so forth. As a result, the system capacity for communicating bearer traffic is increased in the mobile communications network 10, affording service providers enhanced cell capacity without any appreciable additional infrastructure cost.

The type of frequency reuse pattern illustrated in FIG. 1 relies on strict orthogonality of frequencies in adjacent cells or cell sectors. For even more efficient frequency planning, a fractional reuse pattern can be employed, such as a 1×3 or a 1×1 fractional reuse pattern. A frequency can be reused more tightly if it is used only a fraction of the time.

Fractional reuse is employed in conjunction with frequency hopping to improve the quality of communications. Frequency hopping allows a radio transceiver (of either a mobile station or a base station) to use a succession of frequencies (as opposed to being set to a single frequency). The mobile station and base station hop among available frequencies in a cyclic or pseudo-random sequence. Frequency hopping is applied to traffic channels and certain types of control channels. However, frequency hopping has not been used with beacon control signaling, such as BCCH, which is transmitted at a constant frequency.

FIG. 3 shows a 1×3 fractional reuse pattern. The available frequency band 200 is divided into three groups, referred to as group 1, group 2 and group 3. In each cell, each sector is allocated to a different one of the groups. Thus, for example, sector 108A is allocated the carrier frequencies of group 1, sector 108B is allocated the carrier frequencies of group 2, and sector 108C is allocated the carrier frequencies of group 3. For example, group 1 is allocated frequencies F1, F4, F7, and so forth. Group 2 is allocated frequencies F2, F5, F8, and so forth. Group 3 is allocated frequencies F3, F6, F9, and so forth.

Within each group allocated to each sector, only a predetermined fraction (less than all) of the carrier frequencies in each group are actually used at any given time. The tic channels, and some control channels, hop among all the carrier frequencies of the group, with only the predetermined fraction used at any given time.

The traffic channels in each given sector hops to frequencies in a hopping list. The hopping list, however, excludes the carrier frequency used for BCCH in the given sector. Also, the hopping list also excludes the carrier frequencies used for BCCH in neighboring cell sectors. Thus, for example, in the sector 108A, frequency Fx (one of F1, F4, F7, etc.) is allocated for communicating BCCH, with frequency Fx (and frequencies used for BCCH in neighboring cell sectors) excluded from the hopping list in the sector. In sector 108B, frequency Fy (one of F2, F5, F8, etc.) is allocated for communicating BCCH, with frequency Fy (and frequencies used for BCCH in neighboring cell sectors) excluded from the hopping list in the sector. In sector 108C, frequency Fz (one of F3, F6, F9, etc.) is allocated for communicating BCCH, with Fz (and frequencies used for BCCH in neighboring cell sectors) excluded from the hopping list in the sector. The mobile stations and base stations hop among the frequencies of the hopping list in a predetermined (cyclic or pseudo-random) sequence (referred to as the "hopping sequence").

In the 1×3 fraction reuse pattern, frequency orthogonality exists between sectors of a cell (that is, a first group of frequencies is allocated to a first sector, a second group of different frequencies is allocated to a second sector, and a third group of different frequencies is allocated to a third sector). Frequency orthogonality, however, does not exist between cells. Interference is reduced since only a fraction of the available carrier frequencies in each sector is used, with traffic channels hopping among the carrier frequencies.

FIG. 4 shows a 1×1 fractional reuse pattern. With 1×1 fractional reuse, the entire frequency band 200 is allocated to each sector 108 in every cell 102. This can be performed if the cell is entirely synchronous, that is, the sectors of the cell are synchronized with the same time reference, and a common hopping sequence number is used by all sectors in the cell. Different hopping sequence offsets (such as a mobile allocation index offset or MAIO) are used for the different sectors. Thus, for example, sectors 108A, 108B, and 108C all use a common hopping sequence number, which controls the hopping sequence. However, the sectors 108A, 108B, and 108C are assigned different hopping sequence offsets so that hopping within the sectors 108A, 108B, and 108C are out of phase with respect to each other to reduce interference.

In addition, a smaller percentage (than for the 1×3 pattern) of the carrier frequencies in each sector is used at any given time. For example, such a percentage can be as low as 16%.

By using a smaller percentage of the frequencies in the hopping list and by using different hopping sequence offsets in the different sectors of a cell, the likelihood of collisions is decreased.

Figure 5:
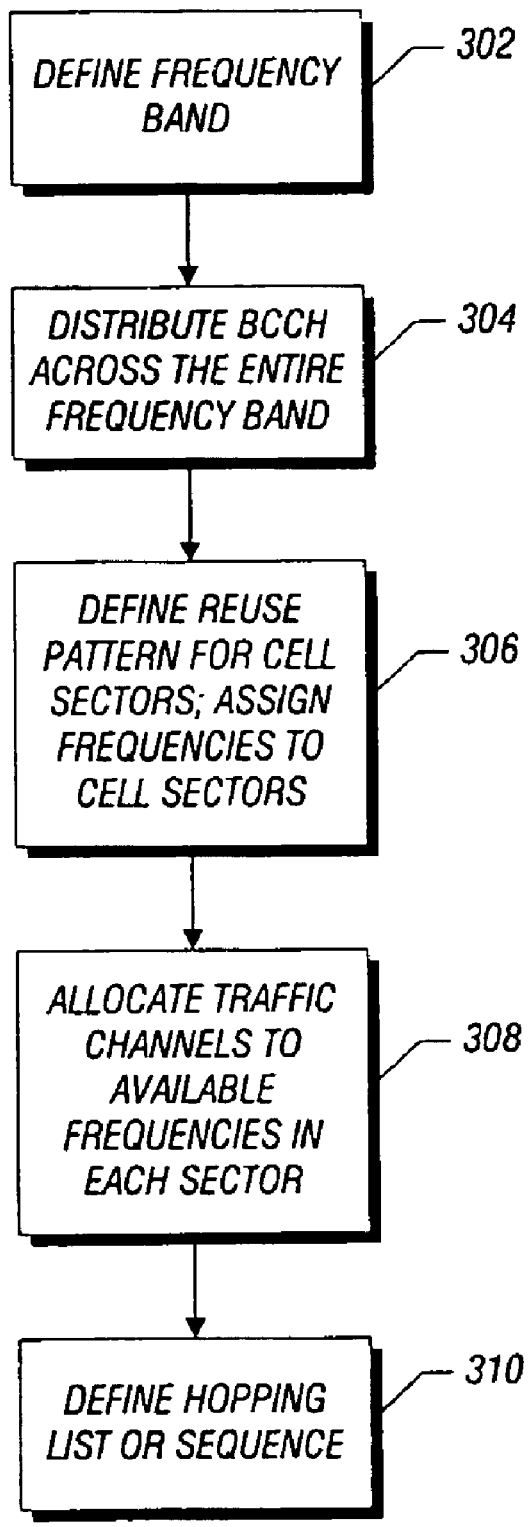
FIG. 5 is a flow diagram of a process performed by a system controller in the mobile communications network of FIG. 1, in accordance with one embodiment of the invention.

Referring to FIG. 5, a process performed by a system controller (e.g., the MSC 110, SGSN 114, or other system controller) is illustrated. The process can be performed by software 124 (FIG. 1) executable on a control unit or processor 120 in the MSC 110. Alternatively, the process can be performed by software 130 executable on a control unit or processor 126 in the SGSN 114.

The system controller defines (at 302) the frequency band 200 containing all available carrier frequencies that can be used to communicate control channels and traffic channels in the mobile communications network 10. The BCCH (or other beacon control signaling) is distributed (at 304) across the whole carrier frequency band 200 so that allocation of a fixed portion of the entire band for the beacon control signaling is not needed. Thus, for each cell sector, BCCH is allocated one of the carrier frequencies of the entire available band 200.

The system controller defines (at 306) a frequency reuse pattern for the mobile communications network 10. As examples, the frequency reuse pattern can be one of the reuse patterns illustrated in FIGS. 1, 3, and 4. In each sector, carrier frequencies are allocated (at 308) to traffic channels. A hopping list is also assigned (at 310) to each cell sector. The content of the hopping list depends on the frequency reuse pattern that is employed. If 1×3 fractional reuse is employed, then the hopping list includes the carrier frequencies of the group to which the cell sector is assigned, excluding the carrier frequency used for BCCH in the given cell sector and the carrier frequencies used for BCCH in all neighboring cell sectors. If 1×1 fractional reuse is employed, then the hopping list includes all carrier frequencies of the entire band 200, again excluding the carrier frequency for BCCH in the given cell sector and carrier frequencies for BCCH in neighboring cell sectors.

Other embodiments involve mobile communications networks that employ frequency reuse without frequency hopping. Example of such frequency reuse patterns are 7×3 or 4×3 patterns, although other examples are also possible.

Instructions of the software routines or modules discussed herein (such as software 124 or 130 in FIG. 1) are stored on one or more storage devices (such as storage devices 122 and 128) in corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

The storage devices include one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each system in one of many different ways. For example, code segments including instructions stored on floppy disks, CD or DVD media, a hard disk, or transported through a network interface card, modem, or other interface device are loaded into the system. In the loading or transport process, data signals that are embodied in carrier waves (transmitted over telephone lines, network lines, wireless links, cables, and the like) communicate the code segments, including instructions, to the system. Such carrier waves are in the form of electrical, optical acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a mobile communications network, comprising:
    defining a band of carrier frequencies for the mobile communications network;
    for a first cell segment, allocating one of the carrier frequencies in the band for communicating beacon control signaling;
    for another cell segment, allocating the one of the carrier frequencies to carry bearer traffic;
    allocating a first group of carrier frequencies to the first cell segment, and allocating a second, distinct group of carrier frequencies to a second cell segment that is different from the another cell segment,
    wherein the one carrier frequency for communicating beacon control signaling is part of the plurality first group of carrier frequencies allocated to the first cell segment.

2. The method of claim 1, wherein allocating the one carrier frequency for communicating beacon control signaling comprises allocating the one carrier frequency for communicating a broadcast control channel.

3. The method of claim 2, wherein defining the band of carrier frequencies for the mobile communications network comprises defining the band of carrier frequencies for at least one of the following networks: a Global System for Mobile (GSM) network; a General Packet Radio Service (GPRS) network; an Enhanced GPRS (EGPRS) network; and a Global System for Mobile/Enhanced Data Rate for Global Evolution Radio Access Network (GERAN).

4. A method for use in a mobile communications network, comprising:
    defining a band of carrier frequencies for the mobile communications network;
    for a first cell segment, allocating one of the carrier frequencies in the band for communicating beacon control signaling;
    for another cell segment, allocating the one of the carrier frequencies to carry bearer traffic;
    allocating a plurality of carrier frequencies to the first cell segment,
    wherein the one carrier frequency for communicating beacon control signaling is part of the plurality of carrier frequencies allocated to the first cell segment;
    defining a hopping sequence among the allocated plurality of carrier frequencies; and
    excluding the one carrier frequency for communicating beacon control signaling from the hopping sequence.

5. The method of claim 4, further comprising communicating traffic channels carrying bearer traffic on carrier frequencies assigned according to the hopping sequence.

6. The method of claim 5, further comprising constantly communicating the beacon control signaling at the one carrier frequency.

7. The method of claim 4, further comprising providing a fractional reuse pattern in the mobile communications network.

8. The method of claim 7, further comprising using, in each cell segment, a fraction that is less than all of the allocated carrier frequencies at any one time.

9. The method of claim 4, further comprising providing a fractional reuse pattern in the mobile communications network.

10. The method of claim 4, further comprising excluding carrier frequencies used for beacon control signaling in neighboring cell segments of the first cell segment from the hopping sequence.

11. The method of claim 4, wherein the fist cell segment is a cell sector that is part of a cell having plural cell sectors, the method further comprising:
    allocating the first group of carrier frequencies to each of the cell sectors in the cell;
    defining the same hopping sequence for each of the cell sectors in the cell; and
    assigning different hopping sequence offsets to respective cell sectors such that hopping through the hopping sequence is out of phase in the plural cell sectors.

12. A method for use in a mobile communications network, comprising:
    defining a band of carrier frequencies for the mobile communications network;
    for a first cell segment, allocating one of the carrier frequencies in the band for communicating beacon control signaling;
    for another cell segment, allocating the one of the carrier frequencies to carry bearer traffic; and
    providing a fractional reuse pattern in the mobile communications network.

13. The method of claim 12, wherein providing the fractional reuse pattern comprises providing one of a 1×3 fractional reuse pattern and a 1×1 fractional reuse pattern.

14. An article comprising at least one storage medium containing instructions for providing communications in a mobile communications network having a band of carrier frequencies, the instructions when executed causing a system to:
    assign, to a first cell segment, a first carrier frequency for communicating beacon control signaling from the band of carrier frequencies;
    assign, to another cell segment, the first carrier frequency to communicate traffic channels;
    assign a group of carrier frequencies to the first cell segment, the group comprising the first carrier frequency;
    exclude the first carrier frequency from communicating traffic channels in the first cell segment;
    define a hopping sequence for the first cell segment among the group of carrier frequencies, the hopping sequence excluding the first carrier frequency; and
    exclude carrier frequencies used for beacon control signaling in neighboring cell segments of the first cell segment from the hopping sequence.

15. An article comprising at least one storage medium containing instructions for providing communications in a mobile communications network having a band of carrier frequencies, the instructions when executed causing a system to:

assign, to a first cell segment, a first carrier frequency for communicating beacon control signaling from the band of carrier frequencies;

assign, to another cell segment, the first carrier frequency to communicate traffic channels; and assign a fractional reuse pattern to the mobile communications network.

16. The article of claim 15, wherein the instructions when executed cause the system to further assign a group of carrier frequencies to the first cell segment, the group comprising the first carrier frequency.

17. The article of claim 16, wherein the instructions when executed cause the system to exclude the first carrier frequency from communicating traffic channels in the first cell segment.

18. The article of claim 17, wherein the instructions when executed cause the system to further define a hopping sequence for the first cell segment among the group of carrier frequencies, the hopping sequence excluding the first carrier frequency.

19. The article of claim 15, wherein the beacon control signaling comprises a broadcast control channel.

20. The article of claim 19, wherein the mobile communications network is selected from the group consisting of: a Global System for Mobile (GSM) network; a General Packet Radio Service (GPRS) network; an Enhanced GPRS (EGPRS) network; and a Global System for Mobile/ Enhanced Data Rate for Global Evolution Radio Access Network (GERAN).

21. A system controller, comprising:

an interface to communicate with cell site equipment of a mobile communications network; and a processor adapted to assign carrier frequencies from an entire available band of carrier frequencies to cell segments, the processor adapted to assign, to a first cell segment, a first carrier frequency to carry beacon control signaling, the first carrier frequency selected from the entire available band of carrier frequencies, the processor adapted to assign, to another cell segment, the first carrier frequency to carry bearer traffic, wherein the processor is adapted to assign a plurality of carrier frequencies to the first cell segment, the plurality of carrier frequencies comprising the first carrier frequency, the processor is adapted to further define a hopping sequence for the traffic channels in the first cell segment, the hopping sequence including the plurality of carrier frequencies but excluding the first carrier frequency.

22. The system controller of claim 21, wherein the processor is adapted to define a fractional reuse pattern for the mobile communications network.

23. The system controller of claim 21 wherein the beacon control signaling comprises a broadcast control channel of a Global System for Mobile (GSM) mobile communications network.

24. The system controller of claim 21, where in the processor is adapted to include frequencies use for beacon control signaling in neighboring cell segments of the first cell segment from the hopping sequence.

25. The system controller of claim 21, wherein the first cell segment is a sell sector that is part of a cell having plural cell sectors, and wherein the processor is adapted to further:

allocate the plurality of carrier frequencies to each of the cell sectors in the cell;

define the same hopping sequence for each of the cell sectors in the cell; and assign different hopping sequence offsets to respective cell sectors such that hopping through the hopping sequence is out of phase in the plural cell sectors.

* * * * *

UNITED STATES PATENT AND TRADEMARK OFFICE
CERTIFICATE OF CORRECTION

PATENT NO. : 6,907,228 B1
DATED : June 14, 2005
INVENTOR(S) : Anit Lohtia, Yuqiang Tang and Paul Chan H. Tse It is certified that error appears in the above-identified patent and that said Letters Patent is hereby corrected as shown below:

<u>Column 7,</u>
Line 31, delete "plurality".

<u>Column 10,</u>
Line 22, "where in" should be -- wherein --;
Line 23, "use" should be -- used --;
Line 27, "sell" should be -- cell --.

Signed and Sealed this

Sixteenth Day of August, 2005

JON W. DUDAS
*Director of the United States Patent and Trademark Office*